US012602219B2

(12) United States Patent
Fujimura

(10) Patent No.: US 12,602,219 B2
(45) Date of Patent: Apr. 14, 2026

(54) INFORMATION PROCESSING APPARATUS CAPABLE OF PREVENTING DELAY OF EXECUTION OF PERIODICALLY EXECUTED PROCESSING, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Takahiro Fujimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 18/333,683

(22) Filed: Jun. 13, 2023

(65) Prior Publication Data

US 2023/0418588 A1 Dec. 28, 2023

(30) Foreign Application Priority Data

Jun. 23, 2022 (JP) ................................. 2022-101218

(51) Int. Cl.
*G06F 9/44* (2018.01)
*G06F 8/65* (2018.01)
(52) U.S. Cl.
CPC ...................................... *G06F 8/65* (2013.01)
(58) Field of Classification Search
CPC ........................................................ G06F 8/65
See application file for complete search history.

(56) References Cited

U.S. PATENT DOCUMENTS

| | | | | |
|---|---|---|---|---|
| 2006/0235949 A1* | 10/2006 | Tai | ............................. | G06F 8/65 |
| | | | | 709/219 |
| 2014/0025974 A1* | 1/2014 | Suwabe | ................ | G06F 1/3287 |
| | | | | 713/323 |
| 2014/0068597 A1* | 3/2014 | Hirahara | ................... | G06F 8/65 |
| | | | | 717/173 |
| 2014/0245283 A1* | 8/2014 | Tanaka | ..................... | G06F 8/65 |
| | | | | 717/172 |
| 2022/0314607 A1* | 10/2022 | Hayashi | ............... | B41J 2/04541 |

FOREIGN PATENT DOCUMENTS

JP         2014-021678 A       2/2014

* cited by examiner

*Primary Examiner* — Qamrun Nahar
(74) *Attorney, Agent, or Firm* — Venable LLP

(57) ABSTRACT

An information processing apparatus capable of preventing execution of periodically executed processing from being delayed due to update of firmware. Execution of update processing for updating the firmware of the information processing apparatus is controlled according to satisfaction of a predetermined condition. A CPU controls, based on a timing at which the predetermined condition is satisfied and a start time of periodically executed processing which is periodically executed by the information processing apparatus, whether to execute the update processing without waiting for completion of the periodically executed processing or execute the update processing after the completion of the periodically executed processing.

17 Claims, 8 Drawing Sheets

Do you enable the automatic update setting?
If there is latest firmware for update for the printer you are using,
the update will be automatically executed.

|  |  |
|---|---|
| DISABLE | ENABLE |

*FIG. 5*

```
<?xml version="1.0" encoding="UTF-8" ?>
<update_data_info>
  <ROMVersion>XXXXX</ROMVersion>
  <ROMSize>YYYYY</ROMSize>
  <ModelName>ZZZZZ</ModelName>
</update_data_info>
```

Figure 6:
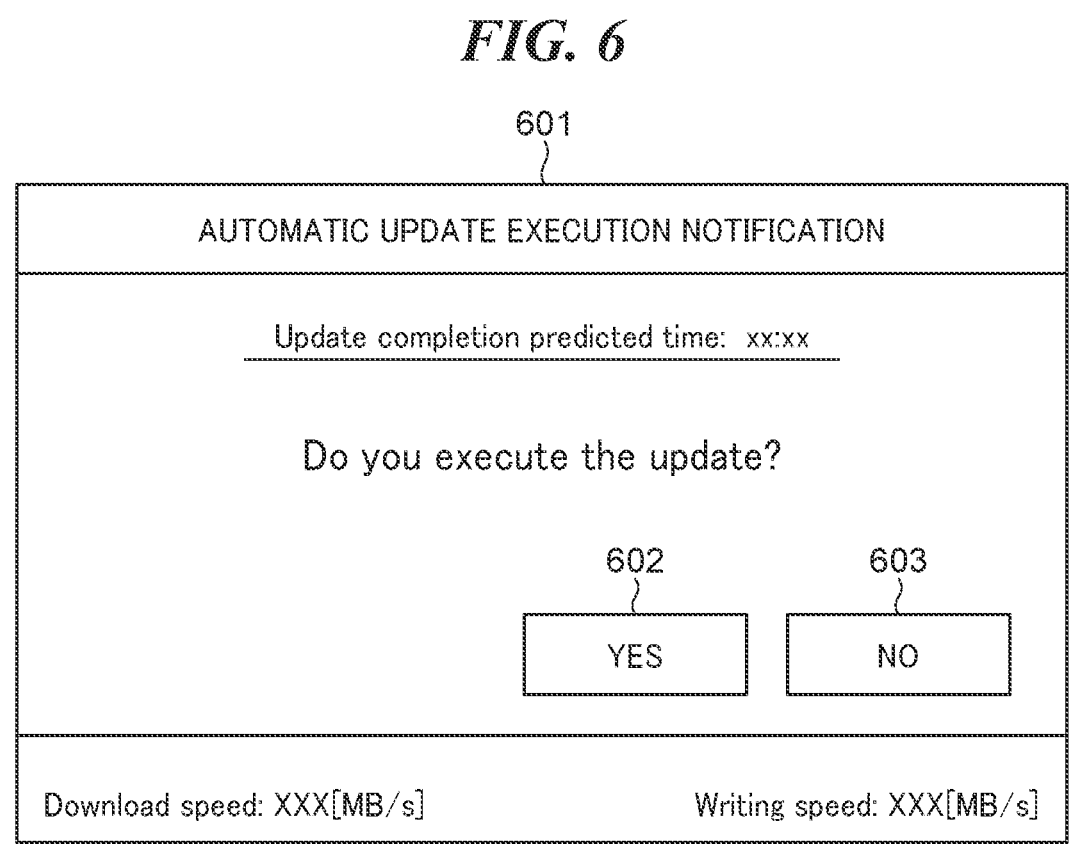

AUTOMATIC UPDATE EXECUTION NOTIFICATION

Update completion predicted time:  xx:xx

Do you execute the update?

602 603

| YES | NO |

Download speed: XXX[MB/s]          Writing speed: XXX[MB/s]

INFORMATION PROCESSING APPARATUS CAPABLE OF PREVENTING DELAY OF EXECUTION OF PERIODICALLY EXECUTED PROCESSING, METHOD OF CONTROLLING INFORMATION PROCESSING APPARATUS, AND STORAGE MEDIUM

BACKGROUND OF THE INVENTION

Field of the Invention

The present invention relates to an information processing apparatus that is capable of preventing delay of execution of periodically executed processing, a method of controlling the information processing apparatus, and a storage medium.

Description of the Related Art

There is known an information processing apparatus, such as a printer, that communicates with a server via a network. The information processing apparatus acquires update data from the server and updates the firmware of the information processing apparatus using the acquired update data. Further, there is known an information processing apparatus that is equipped with a function of periodically automatically updating the firmware so as to always make the firmware updated to the latest version (see e.g. Japanese Laid-Open Patent Publication (Kokai) No. 2014-021678).

However, assuming that update of the firmware is executed as described above, the information processing apparatus is made incapable of executing another processing for a time period in the order of several minutes. This causes a problem of delay of execution of periodically executed processing that is to be periodically executed for the purpose of maintaining the performance of the information processing apparatus and providing a variety of functions.

SUMMARY OF THE INVENTION

The present invention provides an information processing apparatus that is capable of preventing execution of periodically executed processing from being delayed due to update of firmware, a method of controlling the information processing apparatus, and a storage medium.

In a first aspect of the present invention, there is provided an information processing apparatus including at least one memory and at least one processor which function as: a control unit configured to control execution of update processing for updating predetermined data of the information processing apparatus according to satisfaction of a predetermined condition, wherein the control unit controls, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing.

In a second aspect of the present invention, there is provided a method of controlling an information processing apparatus, including controlling execution of update processing for updating predetermined data of the information processing apparatus according to satisfaction of a predetermined condition, and controlling, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing.

According to the present invention, it is possible to prevent execution of periodically executed processing from being delayed due to update of firmware.

Further features of the present invention will become apparent from the following description of exemplary embodiments (with reference to the attached drawings).

BRIEF DESCRIPTION OF THE DRAWINGS

FIG. 4 is a diagram showing an example of a setting screen displayed on a display section appearing in FIG. 2.

FIG. 5 is a diagram showing an example of update data information transmitted by a server appearing in FIG. 1.

FIG. 6 is a diagram showing an example of a selection screen displayed on the display section appearing in FIG. 2.

DESCRIPTION OF THE EMBODIMENTS

The present invention will now be described in detail below with reference to the accompanying drawings showing embodiments thereof. However, it is to be understood that the following exemplary embodiment can be appropriately modified or changed without departing from the spirit and scope of the present invention based on ordinary skill of a person having ordinary skill in the art.

Figure 1:
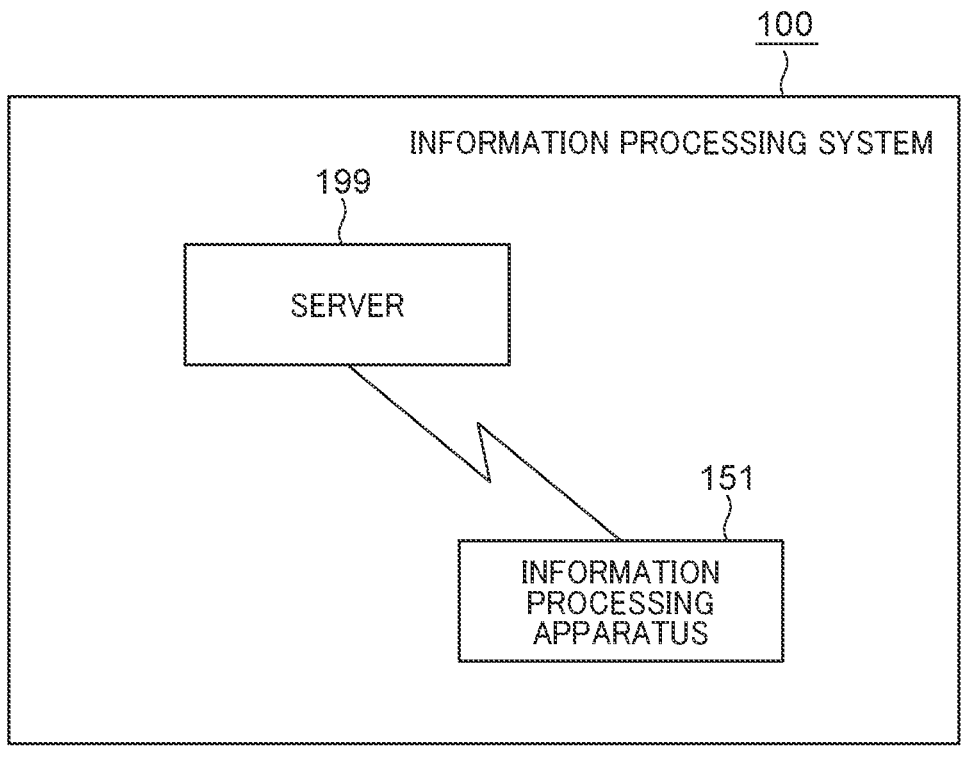
FIG. 1 is a diagram showing a network configuration of an information processing system including an information processing apparatus according to an embodiment of the present invention.

FIG. 1 is a diagram showing a network configuration of an information processing system 100 including an information processing apparatus 151 according to the present embodiment. The information processing system 100 includes the information processing apparatus 151 and a server 199. The information processing apparatus 151 can connect to the server 199 via a network. In the information processing system 100, the information processing apparatus 151 acquires update data from the server 199 and updates the firmware of the information processing apparatus 151 using this update data.

The information processing apparatus 151 is e.g. an image forming apparatus. The image forming apparatus is e.g. an inkjet printer, a full-color laser beam printer, a monochrome printer, a copy machine, or a facsimile machine. Further, the image forming apparatus is a multi-function printer (MFP) equipped with a plurality of functions, such as a copy function, a FAX function, and a print function. Although in the present embodiment, the image forming apparatus will be described as the information processing apparatus 151 by way of example, the information processing apparatus 151 is not limited to the image forming apparatus but may be a communication apparatus equipped with a wireless communication function. The communication apparatus equipped with the wireless communication function is e.g. a mobile terminal, a smartphone, a laptop PC, a tablet terminal, a personal digital assistant (PDA), a digital camera, a music reproduction device, or a television.

Figure 2:
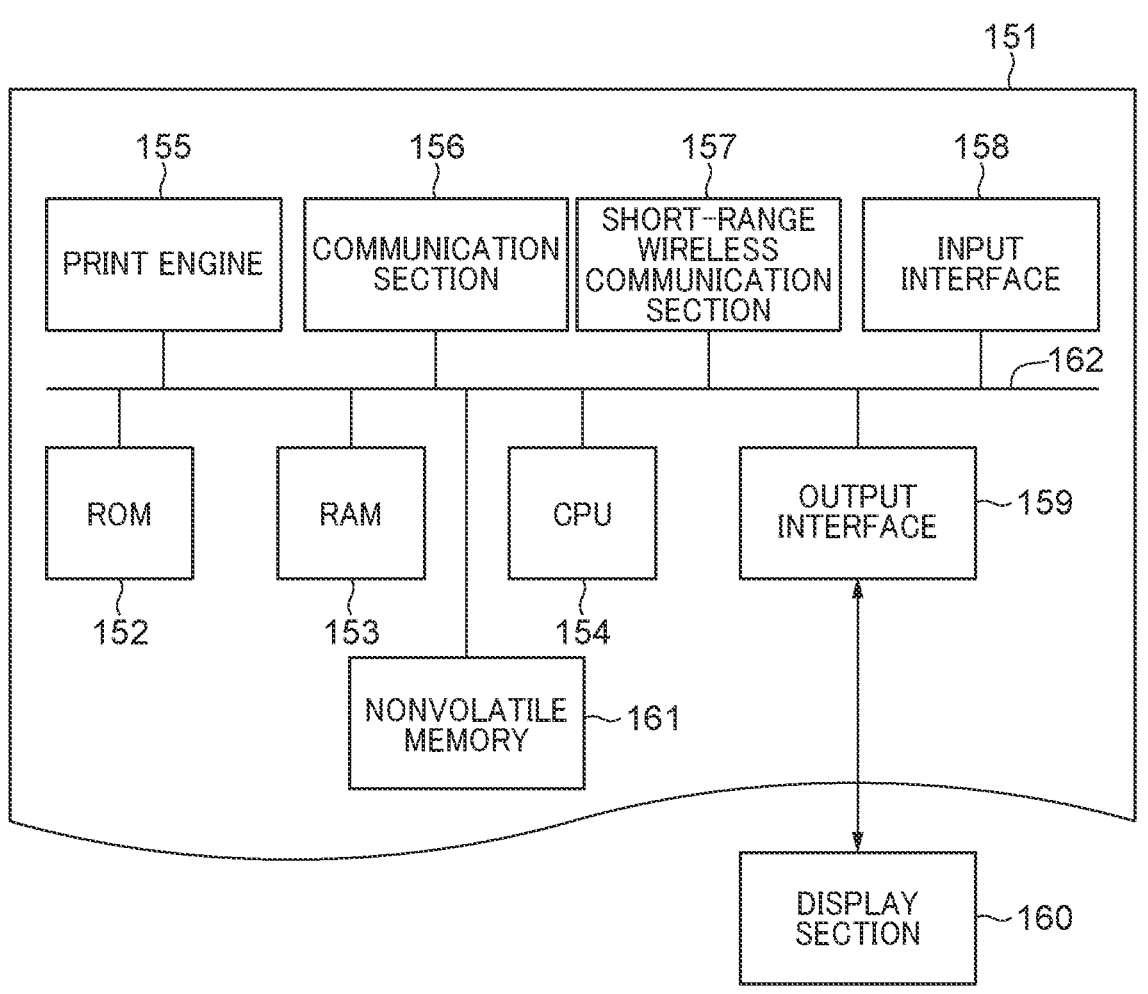
FIG. 2 is a schematic block diagram of the information processing apparatus appearing in FIG. 1.

FIG. 2 is a schematic block diagram of the information processing apparatus 151 appearing in FIG. 1. Referring to FIG. 2, the information processing apparatus 151 includes a read-only memory (ROM) 152, a random access memory (RAM) 153, a central processing unit (CPU) 154, a print engine 155, a communication section 156, a short-range wireless communication section 157, an input interface 158, an output interface 159, and a nonvolatile memory 161. These components are interconnected via a bus 162.

The ROM 152 stores fixed data including e.g. control programs executed by the CPU 154, a data table, and an operating system (OS) program. In the present embodiment, each control program stored in the ROM 152 performs software execution control, such as scheduling, task switching, and interrupt processing, under the control of the built-in OS stored in the ROM 152. Further, the ROM 152 is provided with a memory area for storing data required to be stored even after supply of electric power is stopped, such as management data of the information processing apparatus 151.

The RAM 153 is implemented e.g. by a dynamic random access memory (DRAM) requiring backup power supply. Note that the RAM 153 is supplied with data backup power, not shown, to store data, and hence it is possible to store important data, such as program control variables, without volatilizing the data. Further, the RAM 153 is also used as a main memory and a work memory for the CPU 154. Further, the RAM 153 functions as a reception buffer for temporarily storing print information received e.g. from an external apparatus and stores a variety of information. The CPU 154 is a system controller and controls the overall operation of the information processing apparatus 151.

The print engine 155 forms an image on a recording medium, such as paper, using a recording agent, such as ink, based on information stored in the RAM 153 or a print job received e.g. from an external apparatus, to output a print product. Note that the amount of data of a print job transmitted e.g. from an external apparatus is relatively large and high-speed communication is required, and hence the information processing apparatus 151 receives the print job using the communication section 156 that is capable of performing higher-speed communication than the short-range wireless communication section 157.

The communication section 156 has an access point incorporated in the information processing apparatus 151, for connecting to an external apparatus. This access point allows connection from a communication section of an external apparatus. Note that the communication section 156 may directly communicate with an external apparatus by wireless communication or may communicate with an external apparatus via an external access point. As a communication method, there may be mentioned e.g. Wi-Fi and Bluetooth. Further, the communication section 156 may be equipped with hardware which functions as an access point or may be caused to function as an access point by software.

The short-range wireless communication section 157 performs short-range wireless communication with an external apparatus. The short-range wireless communication section 157 and the CPU 154 communicate with each other via a bus interface, such as an inter-integrated circuit (I2C).

The input interface 158 is an interface for receiving an input of data and an operation instruction from a user and is formed e.g. by a mechanical keyboard, buttons, and a touch panel. Note that the output interface 159 and the input interface 158 may be configured as a single component unit, and an output of a screen and reception of an operation from a user may be performed by the single component unit. A display section 160 is connected to the output interface 159. The output interface 159 is an interface that performs control such that data and status information of the information processing apparatus 151, for example, are displayed on the display section 160.

The display section 160 is comprised of a light emitting diode (LED), a liquid crystal display (LCD), and so forth, and displays e.g. data and the status information of the information processing apparatus 151. Note that a software keyboard including e.g. a numeric input key, a mode setting key, an enter key, a cancel key, and a power key may be displayed on the display section 160 to receive an input from a user via the display section 160.

The nonvolatile memory 161 is implemented by a device, such as an electrically erasable programmable read-only memory (EEPROM) or a flash memory. The nonvolatile memory 161 mainly stores data required to be stored even after supply of electric power is stopped, such as data of settings of the information processing apparatus 151. Note that a memory, such as an external hard disk drive (HDD) or a secure digital (SD) card, may be attached to the information processing apparatus 151 as an optional device, and information stored e.g. in the nonvolatile memory 161 may be stored in this memory. Here, although the roles of the components of the information processing apparatus 151 responsible for the above-described processing operations are divided as described above, by way of example, this form of division of the roles is not limitative, but any another form may be employed.

Figure 3:
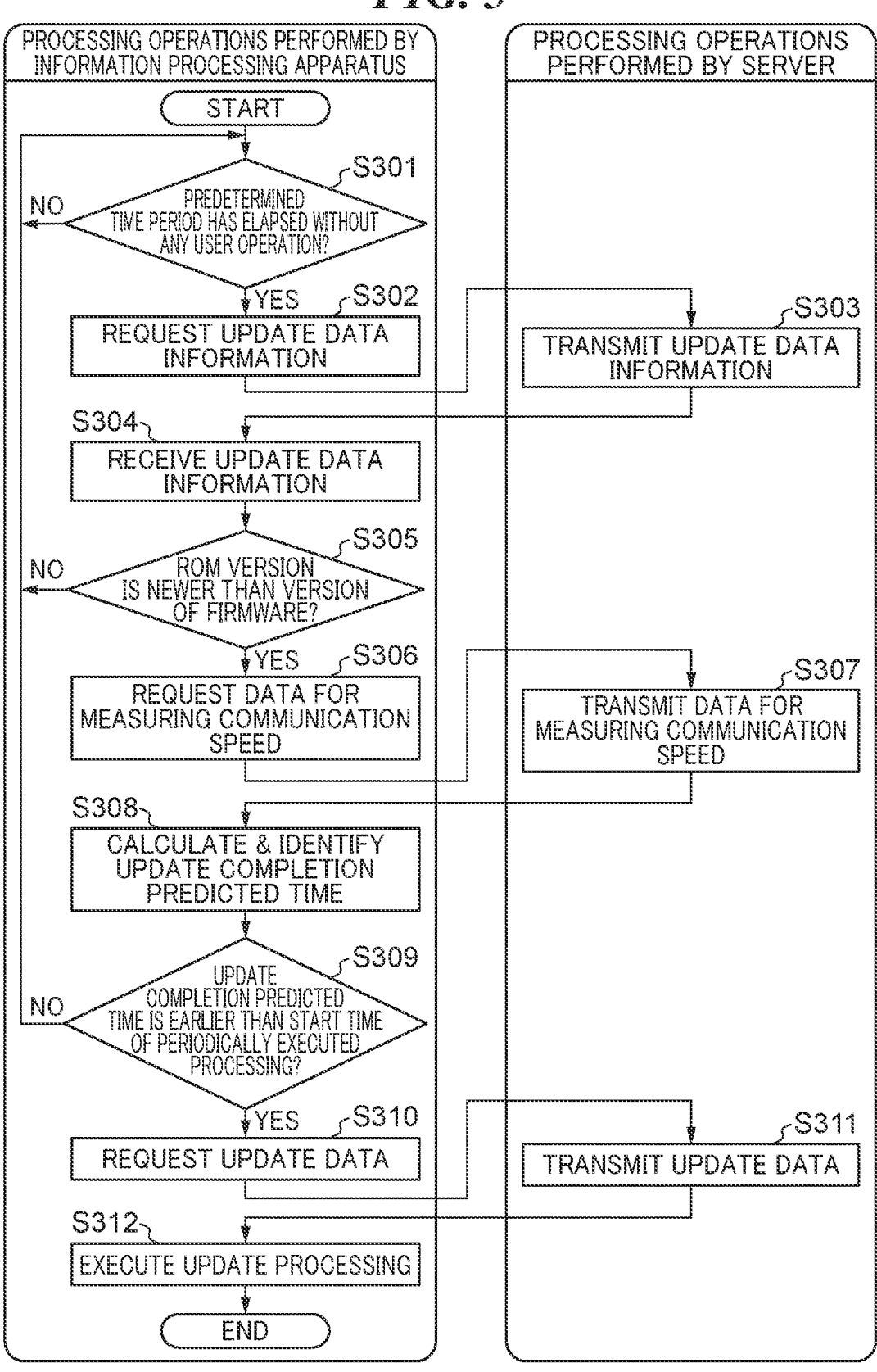
FIG. 3 is a flowchart of an update control process performed by the information processing system shown in FIG. 1.

FIG. 3 is a flowchart of an update control process performed by the information processing system 100 shown in FIG. 1. A part of the update control process in FIG. 3, which is performed by the information processing apparatus 151, is realized by the CPU 154 loading a variety of programs stored in a storage area of the ROM 152 or the like into RAM 153, and executing the loaded programs. Further, a part of the update control process in FIG. 3, which is performed by the server 199, is realized by the server 199 loading a variety of programs stored in a storage area of a ROM or the like of the server 199 into a RAM of the same and executing the loaded programs. Note that in FIG. 3, it is assumed that a function of automatically updating the firmware of the information processing apparatus 151 has been enabled by a user on a setting screen 400 shown in FIG. 4 in advance. The setting screen 400 is for enabling or disabling the function of automatically updating the firmware of the information processing apparatus 151 and is displayed on the display section 160. For example, the setting screen 400 is displayed on the display section 160 when the information processing apparatus 151 is started up for the first time, or when it is detected that update data for the information processing apparatus 151 is newly registered in the server 199.

Referring to FIG. 3, first, the CPU 154 of the information processing apparatus 151 determines whether or not a predetermined condition (condition for starting update processing) is satisfied. Specifically, the CPU 154 starts time counting immediately after any user operation is performed on the input interface 158 or the like and determines whether or not a predetermined time period has elapsed without receiving any user operation on the input interface 158 or the like (step S301). If it is determined in the step S301 that any user operation has been performed on the user interface 158 or the like before the predetermined time period elapses, the process returns to the step S301, and the CPU 154 starts time counting anew for performing the determination in the step S301. If it is determined in the step S301 that the predetermined time period has elapsed without receiving any user operation, the process proceeds to a step S302. In the step S302, the CPU 154 transmits a request for transmitting update data information, to the server 199 via the communication section 156.

Upon receipt of the request, the server 199 transmits the update data information shown in FIG. 5 to the information processing apparatus 151 in a step S303. The update data information is expressed in an XML format as shown in FIG. 5 and includes information on update data of the firmware. For example, the update data information includes e.g. a ROM version (expressed as XXXXX in the illustrated example) indicating a version of the update data, a ROM size (expressed as YYYYY in the illustrated example) indicating a data size of the update data, and a Model Name (expressed as ZZZZZ in the illustrated example) indicating the names of models supporting the update data. Note that in the present embodiment, the server 199 may perform authentication of the information processing apparatus 151 before transmitting the update data information to the information processing apparatus 151.

Then, in a step S304, the CPU 154 of the information processing apparatus 151 receives the update data information from the server 199 via the communication section 156. For example, in a case where the received update data information is not information on update data for the information processing apparatus 151, the CPU 154 discards the received update data information, followed by terminating the present process. Further, in a case where the received update data information is encoded, the CPU 154 decodes the received update data information.

Then, in a step S305, the CPU 154 determines whether or not the ROM version included in the update data information is newer than the version of the firmware of the information processing apparatus 151. If it is determined in the step S305 that the ROM version included in the update data information is not newer than the version of the firmware of the information processing apparatus 151, the process returns to the step S301. If it is determined in the step S305 that the ROM version included in the update data information is newer than the version of the firmware of the information processing apparatus 151, the process proceeds to a step S306.

In the step S306, the CPU 154 transmits a request for transmitting data for measuring a communication speed to the server 199, via the communication section 156. Note that a timing of acquiring the data for measuring a communication speed is not limited to this timing, but the data for measuring a communication speed may be acquired before execution of the step S305.

Upon receipt of this request, the server 199 transmits the data for measuring a communication speed to the information processing apparatus 151 in a step S307. The data for measuring a communication speed is e.g. part of the update data. Note that the server 199 may perform authentication of the information processing apparatus 151 before transmitting the data for measuring a communication speed.

Upon receipt of the data for measuring a communication speed from the server 199 via the communication section 156, the CPU 154 of the information processing apparatus

151 calculates a download speed and a writing speed. For example, the CPU 154 measures a time period required to receive the data for measuring a communication speed from the server 199 (hereinafter referred to as the "reception completion time") using an internal timer of the information processing apparatus 151. The CPU 154 calculates the download speed based on this reception completion time and the data size of the data for measuring the communication speed. Further, the CPU 154 performs control such that the data for measuring the communication speed is written into the nonvolatile memory 161 and a time period required to write the data (hereinafter referred to as the "writing completion time period") is measured using the internal timer of the information processing apparatus 151. The CPU 154 calculates the writing speed based on this writing completion time period and the data size of the data for measuring the communication speed.

In the step S308, further, the CPU 154 calculates and identifies an update completion predicted time based on the download speed, the writing speed, and the ROM data size included in the update data information. When calculating the update completion predicted time, first, the CPU 154 calculates a time period required to execute the update processing. As the download speed and/or the writing speed are/is lower, a longer time period is calculated as the time period required to execute the update processing. Further, as the ROM data size included in the update data information is larger, a longer time period is calculated as the time period required to execute the update processing. After that, a time at which the calculated time period required to execute the update processing is predicted to elapse after a timing at which a condition for starting the update processing has been satisfied is calculated and identified as the update completion predicted time. Note that for example, if the answer to the question of the step S301 is affirmative (YES) and also the answer to the question of the step S305 is affirmative (YES), the condition for starting the update processing is satisfied.

Then, the CPU 154 identifies a start time of processing which is periodically executed (hereinafter referred to as the "periodically executed processing"). For example, the periodically executed processing includes ink circulation processing for maintaining the print quality. Further, the periodically executed processing includes contract information transmission processing for transmitting information related to a subscription contract to an external apparatus, which is performed at the end of each month. Further, the periodically executed processing includes status information transmission processing for transmitting, to an external apparatus, status information of the information processing apparatus 151, such as information indicating a state of a job executed by the information processing apparatus 151 and information indicating a state of consumables equipped in the information processing apparatus 151. Further, the start time of the periodically executed processing is a time which is different for each periodically executed processing and at which a condition determined in advance in association with the periodically executed processing (condition for starting the periodically executed processing) is satisfied. The condition for starting the ink circulation processing is, for example, that one hour elapses after completion of the last ink circulation processing. Further, the condition for starting the status information transmission processing is, for example, that 20 minutes elapse after completion of the last status information transmission processing. Further, the condition for starting the contract information transmission processing is, for example, that the time reaches a predetermined time at midnight (such as 23:59) at the end of each month or a predetermined time in the early morning (such as 6:00) at the beginning of each month. Note that the condition for starting each periodically executed processing may be set in advance when the information processing apparatus 151 is manufactured, or may be set and changed, as desired, by e.g. an operation performed by a user on the information processing apparatus 151. Then, in a step S309, the CPU 154 determines whether or not the update completion predicted time is earlier than the start time of the periodically executed processing.

If it is determined in the step S309 that the update completion predicted time is not earlier than the start time of the periodically executed processing, the periodically executed processing is preferentially executed, and the process returns to the step S301. That is, in the present embodiment, in a case where the update completion predicted time is not earlier than the start time of the periodically executed processing, the periodically executed processing is executed before execution of the update processing for updating the firmware of the information processing apparatus 151. Note that at this time, the periodically executed processing may be started at the start time identified as described above or may be immediately executed when it is determined that the answer to the question of the step S309 is negative (NO) without waiting for the start time identified as described above. Specifically, in a case where the start time of the periodically executed processing is to come between the timing at which the condition for starting the update processing is satisfied and the update completion predicted time, the periodically executed processing is immediately executed when it is determined that the answer to the question of the step S309 is negative (NO), without waiting for the start time. Further, in a case where the start time of the periodically executed processing is to come at a time outside a time slot between the timing at which the condition for starting the update processing is satisfied and the update completion predicted time, the periodically executed processing is executed when the start time comes. The latter case is e.g. a case where the periodically executed processing is executed in a situation where the condition for starting the update processing is not satisfied and the update processing is not required. Further, the latter case is a case where the start time comes after the update completion predicted time.

If it is determined in the step S309 that the update completion predicted time is earlier than the start time of the periodically executed processing, the process proceeds to a step S310. In the step S310, the CPU 154 requests the server 199 to transmit update data, via the communication section 156.

Upon receipt of this request, the server 199 transmits the update data for the information processing apparatus 151 to the information processing apparatus 151 in a step S311. Note that this update data may be all update data for the information processing apparatus 151, including the data for measuring a communication speed, or may be data obtained by excluding the data for measuring a communication speed from the update data for the information processing apparatus 151. Note that the server 199 may perform authentication of the information processing apparatus 151 before transmitting the update data for the information processing apparatus 151 to the information processing apparatus 151. Further, the server 199 may transmit the update data for the information processing apparatus 151 by dividing the update data.

Upon receipt of the update data from the server 199 via the communication section 156, in a step S312, the CPU 154 of the information processing apparatus 151 starts the update processing using the received update data. The update processing is processing for updating the firmware of the information processing apparatus 151. Note that in a case where the received update data is not update data for the information processing apparatus 151, the CPU 154 discards the received update data, followed by terminating the present process. Further, in a case where the received update data is encoded, the CPU 154 decodes the received update data, and executes the update processing using the decoded update data. When the update processing is completed, the present process is terminated. Note that after completion of the update processing, a result of execution of the update processing may be displayed on the display section 160. Further, after completion of the update processing, the information processing apparatus 151 may be restarted.

According to the above-described embodiment, in a case where the update completion predicted time is not earlier than the start time of the periodically executed processing, not the update processing, but the periodically executed processing is executed. With this, it is possible to prevent execution of the periodically executed processing from being delayed due to update of the firmware.

Further, in the above-described embodiment, the update completion predicted time is calculated based on the download speed, the writing speed, and the data size of the update data. That is, a time period required to download the update data and a time period required to write the update data into the nonvolatile memory 161 are taken into account for calculation of the update completion predicted time. With this, it is possible to calculate the update completion predicted time necessary for the control for preventing delay of execution of the periodically executed processing, with high accuracy.

In the above-described embodiment, the data for measuring a communication speed is part of the update data. With this, it is possible to suppress the load of communication with the server 199 to a necessary minimum at a stage before final determination of whether or not to execute the update processing.

In the above-described embodiment, the periodically executed processing includes ink circulation processing for maintaining the print quality. With this, it is possible to prevent the print quality from being degraded due to delay of execution of the periodically executed processing.

Further, in the above-described embodiment, the periodically executed processing includes processing for transmitting information related to a subscription contract, which is performed at the end of each month to an external apparatus. With this, it is possible to prevent a subscription service made available by the subscription contract from being made unavailable due to delay of execution of the periodically executed processing.

Furthermore, in the above-described embodiment, the periodically executed processing includes processing for transmitting the status information of the information processing apparatus 151 to an external apparatus, such as information indicating a state of a job executed by the information processing apparatus 151 and information indicating a state of consumables equipped in the information processing apparatus 151. With this, it is possible to prevent the information processing apparatus 151 from being incapable of notifying a user of the accurate status information due to delay of execution of the periodically executed processing.

In the above-described embodiment, the information processing apparatus 151 is an image forming apparatus that forms an image on a recording medium. With this, in the image forming apparatus that forms an image on a recording medium, it is possible to prevent execution of the periodically executed processing from being delayed due to update of the firmware.

The present invention has been described heretofore based on the above-described embodiment. However, the present invention is not limited to the above-described embodiment. For example, the information processing apparatus 151 may be configured to prompt a user to confirm whether or not to start the update processing. For example, if it is determined in the step S309 that the update completion predicted time is earlier than the start time of the periodically executed processing, a selection screen 601 shown in FIG. 6 may be displayed on the display section 160 before executing the step S310. The selection screen 601 is for prompting a user to select whether or not to execute the update processing. On the selection screen 601, the above-described update completion predicted time, download speed, and writing speed are displayed. This makes it possible to provide information for determining whether or not to execute the update processing to the user. Further, on the selection screen 601, an "Yes" button 602 and a "No" button 603 are displayed. Then, the process proceeds to a step S701 in FIG. 7.

Figure 7:
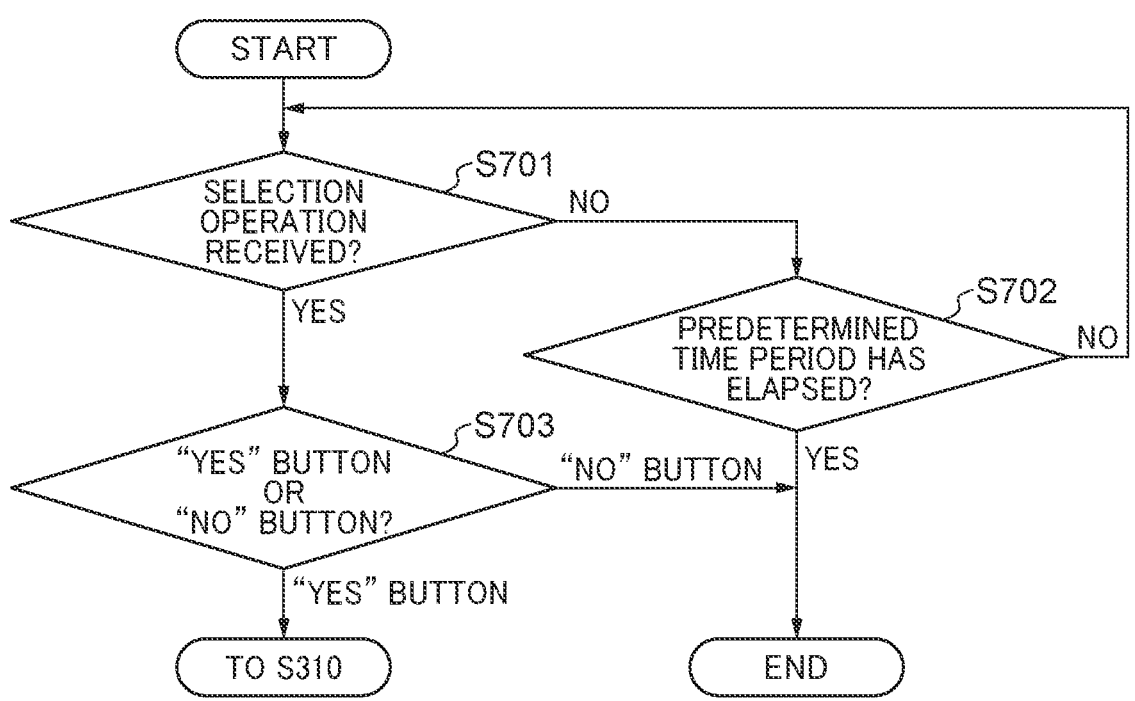
FIG. 7 is a flowchart of a switching control process performed by the information processing apparatus appearing in FIG. 1.

FIG. 7 is a flowchart of a switching control process performed by the information processing apparatus 151 appearing in FIG. 1. The switching control process in FIG. 7 is realized by the CPU 154 loading a variety of programs stored in a storage area of the ROM 152 or the like into the RAM 153, and executing the loaded programs.

In the step S701, the CPU 154 determines whether or not an operation of selecting the "Yes" button 602 or the "No" button 603 by the user has been received If it is determined in the step S701 that neither an operation of selecting the "Yes" button 602 nor an operation of selecting the "No" button 603 by the user has been received, the CPU 154 determines whether or not a predetermined time period has elapsed (step S702).

If it is determined in the step S702 that the predetermined time period has not elapsed, the process returns to the step S701. If it is determined in the step S702 that the predetermined time period has elapsed, the CPU 154 closes the selection screen 601, followed by terminating the present process.

If it is determined in the step S701 that an operation of selecting the "Yes" button 602 or the "No" button 603 by the user has been received, the process proceeds to a step S703. In the step S703, the CPU 154 determines which of the "Yes" button 602 and the "No" button 603 has been selected.

If it is determined in the step S703 that the "Yes" button 602 has been selected, the process proceeds to the step S310 in FIG. 3. If it is determined in the step S703 that the "No" button 603 has been selected, the present process is terminated.

By performing the control to prompt the user to confirm whether or not to start the update processing as described above, it is possible to reflect the user's intention on execution of the update processing.

Note that in the present embodiment, the timing of acquiring the update data is not limited to the above-described timing. For example, the update data may be acquired in advance before determining whether or not a predetermined time period has elapsed without receiving any user operation on the input interface 158 or the like.

Figure 8:
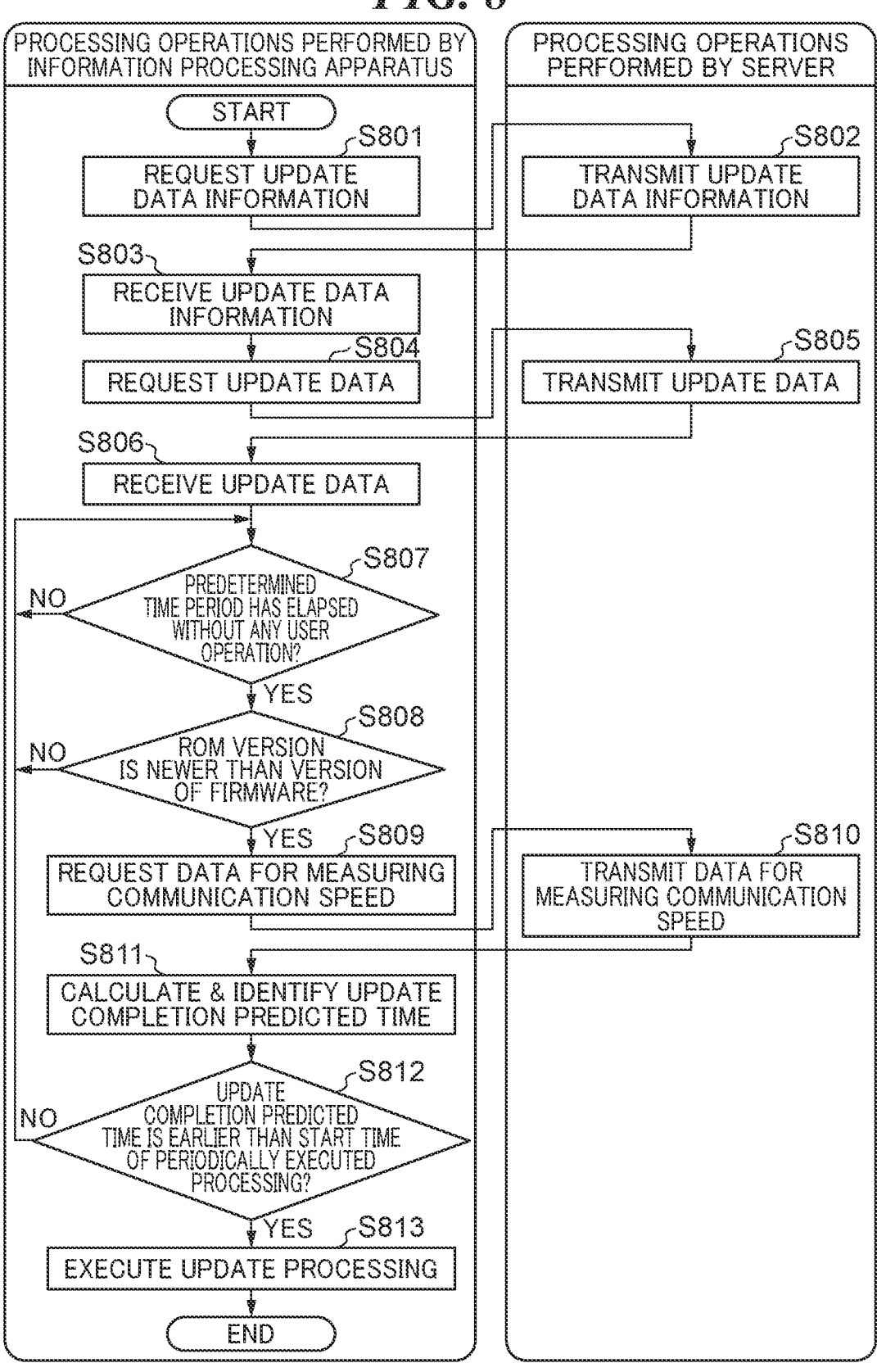
FIG. 8 is a flowchart of a variation of the update control process performed by the information processing system shown in FIG. 1.

FIG. 8 is a flowchart of a variation of the update control process performed by the information processing system 100 shown in FIG. 1. Similar to the process performed by the information processing apparatus 151 in FIG. 3, part of the variation of the update control process in FIG. 8, which is performed by the information processing apparatus 151, is realized by the CPU 154 loading a variety of programs stored in the storage area of the ROM 152 or the like into the RAM 153, and executing the loaded programs. Further, similar to the process performed by the server 199 in FIG. 3, part of the variation of the update control in FIG. 8, which is performed by the server 199, is realized by the server 199 loading a variety of programs stored in the storage area of the ROM or the like of the server 199 into the RAM of the same and executing the loaded programs. Note that in FIG. 8, similar to FIG. 3, it is assumed that the function of automatically updating the firmware of the information processing apparatus 151 has been enabled by a user on the setting screen 400 shown in FIG. 4 in advance.

Referring to FIG. 8, first, in a step S801, the CPU 154 of the information processing apparatus 151 transmits a request for transmitting update data information to the server 199 via the communication section 156.

Upon receipt of the request, the server 199 transmits the above-described update data information shown in FIG. 5 to the information processing apparatus 151 in a step S802. Note that the server 199 may perform authentication of the information processing apparatus 151 before transmitting the update data information to the information processing apparatus 151.

Then, in a step S803, the CPU 154 of the information processing apparatus 151 receives the update data information from the server 199 via the communication section 156. For example, in a case where the received update data information is not information on update data for the information processing apparatus 151, the CPU 154 discards the received update data information, followed by terminating the present process. Further, in a case where the received update data information is encoded, the CPU 154 decodes the received update data information.

Then, in a step S804, the CPU 154 transmits a request for transmitting update data to the server 199, via the communication section 156. Upon receipt of this request, the server 199 transmits the update data for the information processing apparatus 151 to the information processing apparatus 151 in a step S805. Note that the server 199 may perform authentication of the information processing apparatus 151 before transmitting the update data for the information processing apparatus 151 to the information processing apparatus 151. Further, the server 199 may transmit the update data for the information processing apparatus 151 by dividing the update data.

In a step S806, the CPU 154 of the information processing apparatus 151 receives the update data from the server 199 via the communication section 156. Note that in the present embodiment, the processing operations in the steps S801, S803, S804, and S806 are executed when the information processing apparatus 151 is in an idle state. That is, these processing operations are not executed while other internal processing or the periodically executed processing is being executed in the information processing apparatus 151.

Then, the CPU 154 determines whether or not the predetermined condition is satisfied. Specifically, the CPU 154 starts time counting immediately after any user operation is performed on the input interface 158 or the like and determines whether or not a predetermined time period has elapsed without receiving any user operation on the input interface 158 or the like (step S807). If it is determined in the step S301 that any user operation has been performed on the user interface 158 or the like before the predetermined time period elapses, the process returns to the step S807, and the CPU 154 starts time counting anew for performing the determination in the step S807. If it is determined in the step S807 that the predetermined time period has elapsed without receiving any user operation, the process proceeds to a step S808.

In the step S808, the CPU 154 determines whether or not the ROM version included in the update data information is newer than the version of the firmware currently installed in the information processing apparatus 151. If it is determined in the step S808 that the ROM version included in the update data information is not newer than the version of the firmware currently installed in the information processing apparatus 151, the process returns to the step S807. If it is determined in the step S808 that the ROM version included in the update data information is newer than the version of the firmware currently installed in the information process-ing apparatus 151, the process proceeds to a step S809.

In the step S809, the CPU 154 transmits a request for transmitting data for measuring a communication speed to the server 199, via the communication section 156. Note that the timing of acquiring the data for measuring a communi-cation speed is not limited to this timing, but the data for measuring a communication speed may be acquired before execution of the step S808.

Upon receipt of this request, the server 199 transmits the data for measuring a communication speed to the informa-tion processing apparatus 151 in a step S810. The data for measuring a communication speed is, for example, data which is not related to the update data for the information processing apparatus 151 and is smaller in data size than the update data. With this, it is possible to reduce the load of communication with the server 199 at a stage before final determination of whether or not to execute the update processing. Note that the server 199 may perform authen-tication of the information processing apparatus 151 before transmitting the data for measuring a communication speed to the information processing apparatus 151.

Upon receipt of the data for measuring a communication speed from the server 199 via the communication section 156, the CPU 154 of the information processing apparatus 151 calculates a download speed by the same method as described in the step S308.

Then, in a step S811, the CPU 154 calculates and iden-tifies an update completion predicted time based on the download speed and the ROM data size included in the update data information. When calculating the update completion predicted time, first, the CPU 154 calculates a time period required to execute the update processing. As the download speed and/or the writing speed are/is lower, a longer time period is calculated as the time period required to execute the update processing. Further, as the ROM data size included in the update data information is larger, a longer time period is calculated as the time period required to execute the update processing. Then, after that, a time at which the calculated time period required to execute the update processing is predicted to elapse after a timing at which the condition for starting the update processing has been satisfied is calculated and identified as the update completion predicted time. Note that for example, if the answer to the question of the step S807 is affirmative (YES) and also the answer to the question of the step S808 is affirmative (YES), the condition for starting the update processing is satisfied. Then, the CPU 154 identifies the start time of the periodically executed processing. Then, in a step S812, the CPU 154 determines whether or not the update completion predicted time is earlier than the start time of the periodically executed processing.

If it is determined in the step S812 that the update completion predicted time is not earlier than the start time of the periodically executed processing, the periodically executed processing is preferentially executed, and the pro-cess returns to the step S807.) That is, in FIG. 8 as well, similar to FIG. 3, in a case where the update completion predicted time is not earlier than the start time of the periodically executed processing, the periodically executed processing is executed before execution of the update pro-cessing for updating the firmware of the information pro-cessing apparatus 151.

If it is determined in the step S812 that the update completion predicted time is earlier than the start time of the periodically executed processing, the process proceeds to a step S813, wherein the CPU 154 starts the update processing using the update data received in the step S806. Note that in a case where this update data is not the update data for the information processing apparatus 151, the CPU 154 discards this update data, followed by terminating the present pro-cess. Further, in a case where this update data is encoded, the CPU 154 decodes the update data and then starts the update processing. When the update processing is completed, the present process is terminated. Note that after completion of the update processing, a result of execution of the update processing may be displayed on the display section 160. Further, after completion of the update processing, the information processing apparatus 151 may be restarted.

Thus, also when the update control process is configured such that the update data is acquired in advance, in a case where the update completion predicted time is not earlier than the start time of the periodically executed processing, the periodically executed processing is executed before execution of the update processing. This makes it possible to prevent execution of the periodically executed processing from being delayed due to update of the firmware also when the update control process is configured such that the update data is acquired in advance.

Note that a method of controlling update of the firmware by calculating the update completion predicted time is described above, this is not limitative, but a method of not calculating the update completion predicted time may be employed. In this method, specifically, for example, the CPU 154 identifies a start time of the periodically executed processing according to satisfaction of the condition for starting the update processing. Then, the CPU 154 deter-mines whether or not the identified start time of the peri-odically executed processing is to come before a predeter-mined time period registered in the information processing apparatus 151 in advance elapses after the timing at which the condition for starting the update processing is satisfied. The predetermined time period is e.g. 10 minutes. Then, if the answer to the question of this determination is affirma-tive (YES), the CPU 154 postpones the update processing until the periodically executed processing is completed. That is, the update processing is executed after the periodically executed processing is completed. On the other hand, if the answer to the question of this determination is negative (NO), the CPU 154 immediately executes the update pro-cessing without waiting for completion of the periodically executed processing. Thus, in the present invention, it is only required to perform the update control process in which whether to postpone the update processing or execute the update processing without postponing the update processing is controlled based on the timing at which the condition for starting the update processing is satisfied and the start time of the periodically executed processing.

Further, although the case where the data to be updated is the firmware of the information processing apparatus 151 is described above, this is not limitative, but any other type of data may be used as the data to be updated insofar as it is data held by the information processing apparatus 151.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-101218 filed Jun. 23, 2022, which is hereby incorporated by reference herein in its entirety.

What is claimed is:

1. An information processing apparatus comprising:
at least one memory storing instructions; and
at least one processor which, upon executing the stored instructions, performs the functions of:
a control unit that controls execution of update processing for updating predetermined data of the information processing apparatus according to satisfaction of a predetermined condition,
wherein the control unit controls, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing, wherein the at least one processor, upon executing the stored instructions, further performs the functions of a time calculation unit that calculates a completion predicted time of the update processing based on the timing at which the predetermined condition is satisfied, and
wherein in a case where the completion predicted time of the update processing is earlier than the start time of the predetermined processing which is periodically executed by the information processing apparatus, the control unit executes the update processing without waiting for the completion of the predetermined processing, and in a case where the completion predicted time of the update processing is not earlier than the start time of the predetermined processing, the control unit executes the update processing after the completion of the predetermined processing, and
wherein the at least one processor, upon executing the stored instructions, further performs the functions of
a first calculation unit that calculates a download speed based on a time period required to perform processing for receiving predetermined data from a server that provides update data used for the update processing, and
a second calculation unit that calculates a writing speed based on a time period required to perform processing for writing the predetermined data into a storage unit of the information processing apparatus, and
wherein the time calculation unit calculates the completion predicted time of the update processing based on the download speed, the writing speed, and a data size of the update data.

2. The information processing apparatus according to claim 1, wherein the predetermined data is part of the update data.

3. The information processing apparatus according to claim 1, wherein the predetermined data is data which is different from the update data and is smaller in data size than the update data.

4. The information processing apparatus according to claim 1, wherein the predetermined processing includes ink circulation processing.

5. The information processing apparatus according to claim 1, wherein the predetermined processing includes processing for transmitting information related to a subscription contract to an external apparatus.

6. The information processing apparatus according to claim 1, wherein the predetermined processing includes processing for transmitting status information of the information processing apparatus to an external apparatus.

7. The information processing apparatus according to claim 1, wherein the at least one memory and the at least one processor further function as a display control unit configured to perform, in a case where the completion predicted time of the update processing is not earlier than the start time of the predetermined processing, control such that a selection screen for prompting a user to select whether or not to execute the update processing is displayed on a display section of the image processing apparatus, and
wherein the completion predicted time of the update processing is displayed on the selection screen.

8. The information processing apparatus according to claim 1, wherein in a case where the start time of the predetermined processing is not to come before a predetermined time elapses after the timing at which the predetermined condition is satisfied, the control unit executes the update processing without waiting for the completion of the predetermined processing, and in a case where the start time of the predetermined processing is to come before the predetermined time elapses after the timing at which the predetermined condition is satisfied, the control unit executes the update processing after the completion of the predetermined processing.

9. The information processing apparatus according to claim 1, wherein in a case where the start time of the predetermined processing is to come before a predetermined time period elapses after the timing at which the predetermined condition is satisfied, the control unit starts the predetermined processing at a timing before the start time of the predetermined processing, and wherein in a case where the start time of the predetermined processing is to come at a time outside a time slot between the timing at which the predetermined condition is satisfied and a time at which the predetermined time period elapses, the control unit starts the predetermined processing at the start time of the predetermined processing.

10. The information processing apparatus according to claim 1, wherein the start time of the predetermined processing is a timing at which a condition determined in advance in association the predetermined processing is satisfied.

11. The information processing apparatus according to claim 1, wherein the predetermined data is firmware.

12. The information processing apparatus according to claim 1, wherein the information processing apparatus is an image forming apparatus that forms an image on a recording medium.

13. A method of controlling an information processing apparatus, comprising:

controlling execution of update processing for updating predetermined data of the information processing apparatus according to satisfaction of a predetermined condition; and controlling, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing;

calculating a completion predicted time of the update processing based on the timing at which the predetermined condition is satisfied, wherein in a case where the completion predicted time of the update processing is earlier than the start time of the predetermined processing which is periodically executed by the information processing apparatus, the update processing is executed without waiting for the completion of the predetermined processing, and in a case where the completion predicted time of the update processing is not earlier than the start time of the predetermined processing, the update processing is executed after the completion of the predetermined processing;

performing a first calculation to calculate a download speed based on a time period required to perform processing for receiving predetermined data from a server that provides update data used for the update processing; and performing a second calculation to calculate a writing speed based on a time period required to perform processing for writing the predetermined data into a storage unit of the information processing apparatus, wherein the completion predicted time of the update processing is calculated based on the download speed, the writing speed, and a data size of the update data.

14. A non-transitory tangible computer-readable storage medium storing a program for causing a computer to execute a method of controlling an information processing apparatus, wherein the method comprises:

controlling execution of update processing for updating predetermined data of the information processing apparatus according to satisfaction of a predetermined condition;

controlling, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing;

calculating a completion predicted time of the update processing based on the timing at which the predetermined condition is satisfied, wherein in a case where the completion predicted time of the update processing is earlier than the start time of the predetermined processing which is periodically executed by the information processing apparatus, the update processing is executed without waiting for the completion of the predetermined processing, and in a case where the completion predicted time of the update processing is not earlier than the start time of the predetermined processing, the update processing is executed after the completion of the predetermined processing;

performing a first calculation to calculate a download speed based on a time period required to perform processing for receiving predetermined data from a server that provides update data used for the update processing; and performing a second calculation to calculate a writing speed based on a time period required to perform processing for writing the predetermined data into a storage unit of the information processing apparatus, wherein the completion predicted time of the update processing is calculated based on the download speed, the writing speed, and a data size of the update data.

15. An information processing apparatus comprising:

at least one memory storing instructions; and at least one processor which, upon executing the stored instructions, performs the functions of:

a control unit that controls execution of update processing for updating predetermined data of the information processing apparatus according to satisfaction of a predetermined condition, wherein the control unit controls, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing, wherein in a case where the start time of the predetermined processing is to come before a predetermined time period elapses after the timing at which the predetermined condition is satisfied, the control unit starts the predetermined processing at a timing before the start time of the predetermined processing, and wherein in a case where the start time of the predetermined processing is to come at a time outside a time slot between the timing at which the predetermined condition is satisfied and a time at which the predetermined time period elapses, the control unit starts the predetermined processing at the start time of the predetermined processing.

16. A method of controlling an information processing apparatus, comprising:

controlling execution of update processing for updating predetermined data of the information processing apparatus according to satisfaction of a predetermined condition, controlling, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing, wherein in a case where the start time of the predetermined processing is to come before a predetermined time period elapses after the timing at which the predetermined condition is satisfied, the controlling starts the predetermined processing at a timing before the start time of the predetermined processing, and wherein in a case where the start time of the predetermined processing is to come at a time outside a time slot between the timing at which the predetermined condition is satisfied and a time at which the predetermined time period elapses, the controlling starts the predetermined processing at the start time of the predetermined processing.

17. A non-transitory tangible computer-readable storage medium storing a program for causing a computer to execute a method of controlling an information processing apparatus, wherein the method comprises:

controlling execution of update processing for updating predetermined data of the information processing apparatus according to satisfaction of a predetermined condition, controlling, based on a timing at which the predetermined condition is satisfied and a start time of predetermined processing which is periodically executed by the information processing apparatus, whether to execute the update processing without waiting for completion of the predetermined processing or execute the update processing after the completion of the predetermined processing, wherein in a case where the start time of the predetermined processing is to come before a predetermined time period elapses after the timing at which the predetermined condition is satisfied, the controlling starts the predetermined processing at a timing before the start time of the predetermined processing, and wherein in a case where the start time of the predetermined processing is to come at a time outside a time slot between the timing at which the predetermined condition is satisfied and a time at which the predetermined time period elapses, the controlling starts the predetermined processing at the start time of the predetermined processing.

* * * * *